(12) United States Patent　　　　(10) Patent No.:　　US 12,698,806 B2

Messing et al.　　　　　　　　　　　(45) Date of Patent:　　　　Aug. 4, 2026

(54) STEERING SHAFT ASSEMBLY

(71) Applicant: Steering Solutions IP Holding Corporation, Saginaw, MI (US)

(72) Inventors: Matthew L. Messing, Saginaw, MI (US); Douglas M. Schneider, Frankenmuth, MI (US); Steven R. Burk, Frankenmuth, MI (US); Robert J. Smith, Midland, MI (US); Phillip D. Beckman, Jr., Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 460 days.

(21) Appl. No.: 18/324,505

(22) Filed: May 26, 2023

(65) Prior Publication Data

US 2024/0240674 A1　　Jul. 18, 2024

Related U.S. Application Data

(60) Provisional application No. 63/438,586, filed on Jan. 12, 2023.

(51) Int. Cl.
F16D 1/112　　　　(2006.01)

(52) U.S. Cl.
CPC .................................... F16D 1/112 (2013.01)

(58) Field of Classification Search
CPC ........ F16D 1/04; F16D 1/0888; F16D 1/0876; F16D 1/0894
USPC ................................................ 403/355–359.6
See application file for complete search history.

(56) References Cited

U.S. PATENT DOCUMENTS

| | | | | |
|---|---|---|---|---|
| 2,437,305 A | * | 3/1948 | Nickle | F16B 35/005 |
| | | | | 411/301 |
| 4,287,972 A | * | 9/1981 | Petrak | F16D 43/206 |
| | | | | 192/54.2 |
| 4,696,382 A | * | 9/1987 | Aho | B60K 17/3515 |
| | | | | 192/69.43 |
| 5,807,180 A | * | 9/1998 | Knodle | F16D 1/0882 |
| | | | | 464/144 |
| 6,222,292 B1 | * | 4/2001 | Smith | F16D 1/112 |
| | | | | 310/91 |
| 6,382,624 B1 | * | 5/2002 | Kelm | B41F 13/008 |
| | | | | 464/182 |

(Continued)

FOREIGN PATENT DOCUMENTS

| | | |
|---|---|---|
| DE | 4129042 A1 | 3/1993 |
| JP | H0624300 Y2 | 6/1994 |
| JP | 2019206217 A | 12/2019 |

OTHER PUBLICATIONS

English translation of Examination Report regarding related DE App. No. 10 2023 133 449.2; issued Oct. 15, 2025.

*Primary Examiner* — Daniel J Wiley

(74) *Attorney, Agent, or Firm* — Dickinson Wright PLLC

(57)　　　　ABSTRACT

A steering shaft assembly includes a shaft having an end region to be coupled to another component with a mechanical fastener, the shaft comprising a protrusion extending radially outwardly from the shaft within the end region of the shaft. The steering shaft assembly also includes a ring flag coupleable to the end region of the shaft, the ring flag comprising a recess positioned to receive the protrusion of the shaft at a desired relative axial position of the ring flag and the shaft to rotationally align the ring flag and the shaft at a desired rotational position.

12 Claims, 7 Drawing Sheets

(56) References Cited

U.S. PATENT DOCUMENTS

| | | | |
|---|---|---|---|
| 6,390,925 B1* | 5/2002 | Perrow | F16D 3/2055 |
| | | | 464/111 |
| 6,739,540 B2* | 5/2004 | Shiotani | B60R 22/46 |
| | | | 74/451 |
| 8,092,312 B2* | 1/2012 | Duncan | F16D 3/387 |
| | | | 464/134 |
| 2001/0002966 A1* | 6/2001 | Aota | F16C 3/03 |
| | | | 403/359.5 |
| 2010/0119301 A1* | 5/2010 | Langer | F16D 1/116 |
| | | | 403/359.5 |
| 2012/0027508 A1* | 2/2012 | Juh | F16D 1/0876 |
| | | | 29/428 |
| 2024/0174284 A1* | 5/2024 | Partyka | B62D 1/16 |
| 2024/0175462 A1* | 5/2024 | Messing | B62D 1/20 |

* cited by examiner

STEERING SHAFT ASSEMBLY

CROSS-REFERENCE TO RELATED APPLICATION

This application claims priority to U.S. Provisional Patent Application Ser. No. 63/438,586, filed Jan. 12, 2023, the disclosure of which is incorporated by reference herein in its entirety.

FIELD OF THE INVENTION

The embodiments disclosed herein relate to vehicle steering systems and, more particularly, a steering shaft assembly and methods associated with assembly thereof.

BACKGROUND

Steering systems include a steering shaft assembly which connects a steering input device (e.g., steering wheel) to some type of output component or assembly to carry out steering maneuvers for a vehicle. An intermediate steering shaft is often part of a steering shaft assembly. The intermediate steering shaft may be difficult for OEM's to assemble in the vehicle correctly due various factors, including tight environment, assembly from below the vehicle, low lighting, a need to walk with the vehicle during assembly, limited cycle time. With these complications, special considerations must be taken to ensure the connections of the intermediate steering shaft with bolts can only be made in the correct position so that a "false assembly" does not erroneously occur.

One solution involves a ring with a flag that is oriented with, and snapped on to, the shaft connection that blocks the bolt from passing through the yoke hole while the shaft is partially engaged inside the yoke. During assembly, the ring flag must be expanded over a lead-in and retaining shoulder and after it is pressed to position the ring will snap into the groove. The ring flag has no geometrical alignment with the shaft until after pressing the ring a specified distance. Therefore, the assembly process requires an assembly tool to properly align the ring flag to the shaft serrations which poses a risk to damaging the shaft serrations. The receiving alignment geometry on the shaft cannot be formed and must be machined which results in higher cost.

SUMMARY

According to one aspect of the disclosure, a steering shaft assembly includes a shaft having an end region to be coupled to another component with a mechanical fastener, the shaft comprising a protrusion extending radially outwardly from the shaft within the end region of the shaft. The steering shaft assembly also includes a ring flag coupleable to the end region of the shaft, the ring flag comprising a recess positioned to receive the protrusion of the shaft at a desired relative axial position of the ring flag and the shaft to rotationally align the ring flag and the shaft at a desired rotational position.

According to another aspect of the disclosure, a method of assembling a steering shaft assembly is provided. The method includes aligning a protrusion extending radially outward from an end portion of a shaft with a recess defined by an inner wall of a ring flag. The method also includes inserting a shaft through an aperture defined by a ring flag with the protrusion disposed within the recess to provide a desired rotational position of the ring flag relative to the shaft. The method further includes axially moving the shaft to a desired axial position relative to the ring flag.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
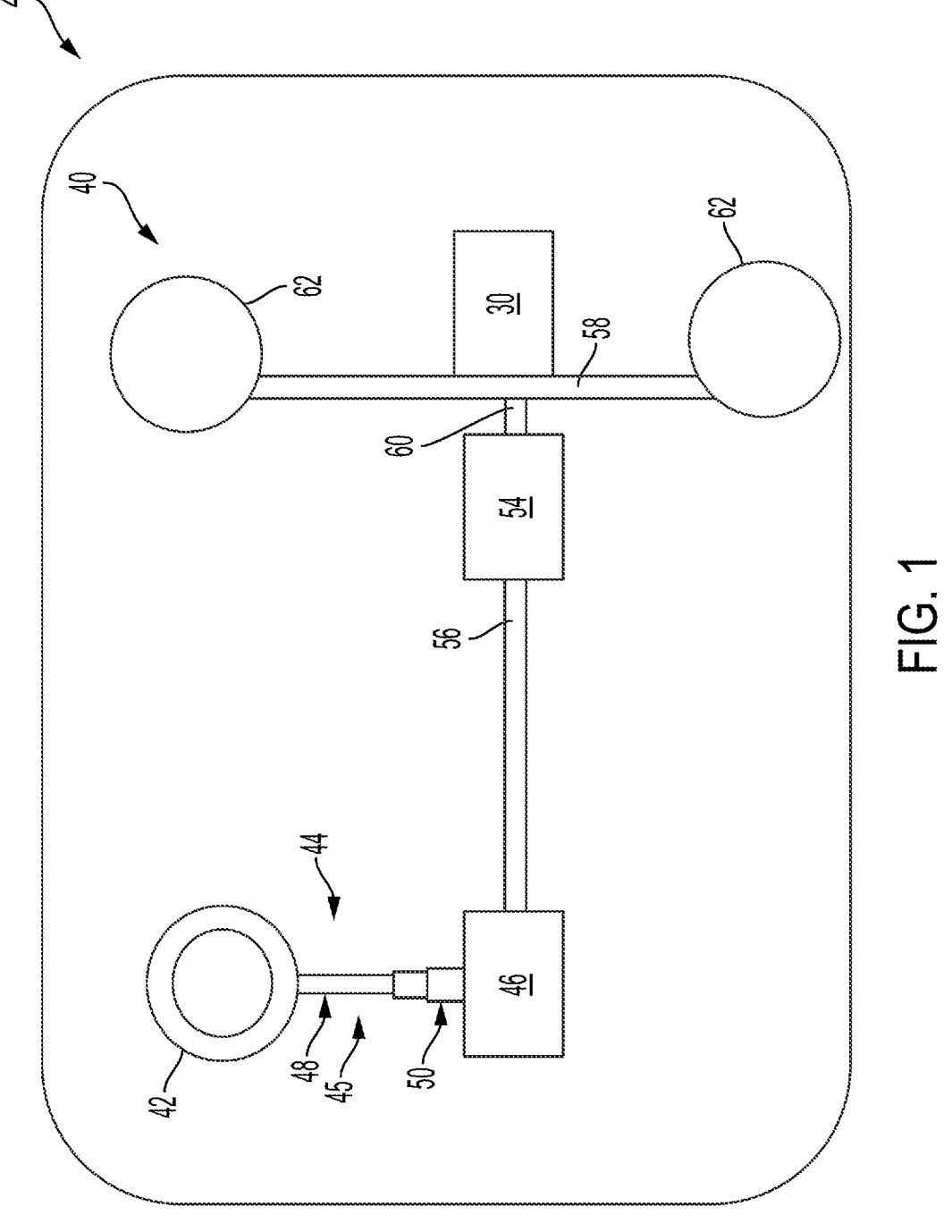
FIG. 1 is a schematic illustration of a vehicle steering system.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other vehicles. The vehicle 20 may include a propulsion system 30, such as an ignition system, an electronic system, or combinations thereof.

The vehicle 20 further includes a steering system 40. The steering system 40 may be configured as a driver interface steering system, an autonomous driving system, or a system that allows for both driver interface and autonomous steering. The steering system 40 may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any feature conventionally located opposite the input device 42.

The steering column 45 may include at least two axially adjustable portions, for example, an upper jacket 48 and a lower jacket 50 that are axially adjustable with respect to one another. The at least two axially adjustable portions may further include one or more third portions 49 disposed between the upper jacket 48 and the lower jacket 50 in some embodiments. It is to be appreciated that other structural features of the steering column 45 may be part of the upper jacket 48 and the lower jacket 50, such as brackets, rails, other devices, or combinations thereof.

The steering column 45 is moveable over a range of positions from a fully extended position to a fully retracted position. In the fully extended position, the upper jacket 48 and the lower jacket 50 are moved axially so that the input device 42 is located near an operator of the vehicle. In the retracted position, the upper jacket 48 and the lower jacket 50 are moved axially so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In operation, the axial movement of the upper jacket 48 and the lower jacket 50 may be effectuated by manual movement by an operator or electromechanically by a telescope actuator. This axial movement adjusts between the extended position, the retracted position, and any intermediary positions.

A steering gear assembly 54, the output assembly 46 and the steering input device 42 may be connected via a steering shaft assembly 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering shaft assembly 56 causes a responsive movement of the output shaft 60 and causes the drive axle to turn wheels 62. It is to be appreciated that the steering components described herein may be part of a steer-by-wire system or one which includes a direct mechanical linkage over the span of the components.

Figure 2:
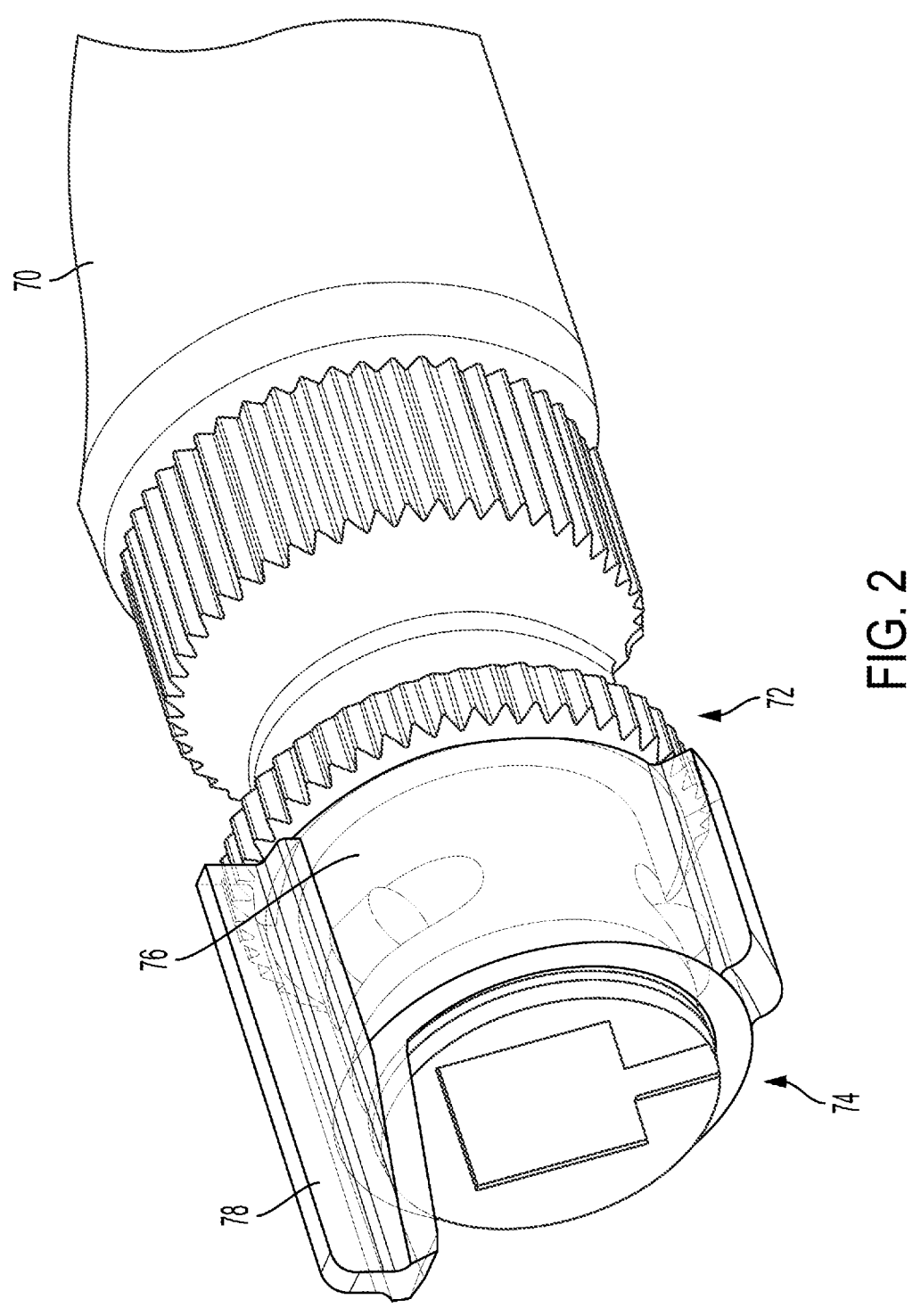
FIG. 2 is a perspective view of a portion of a joint region of a steering shaft assembly of the vehicle steering system.

Referring to FIG. 2, a portion of a steering shaft assembly 56 is shown, specifically an end portion of an intermediate shaft 70 which is coupleable to a connecting component, such as a yoke (not shown). The intermediate shaft 70 extends along a steering column axis. The illustrated portion of the intermediate shaft 70 may be referred to as a joint region 72 where the intermediate shaft 70 is coupled to the connecting component (e.g., yoke). Also illustrated is a ring flag 74 which serves as an error-proofing device that facilitates coupling of the intermediate shaft 70 with the other connecting component.

The other structural member (e.g., yoke) defines a hole for a pin or bolt to be inserted for coupling to the intermediate shaft 70. It is desirable to couple the intermediate shaft 70 and the other structural member at a specific axial position. The embodiments described herein facilitate precise and reliable coupling at such a desired position. The ring flag 74 includes a ring portion 76 and a flag portion 78. The ring portion 76 is a substantially cylindrical member sized to accommodate receiving the end portion of the intermediate shaft 70 therein. The flag portion 78 is longer axially compared to the ring portion 76. The flag portion 78 blocks insertion of the pin, bolt of the like until the connecting member is axially moved to an extent where the flag portion 78 no longer blocks insertion of the pin or bolt.

Figures 3, 4:
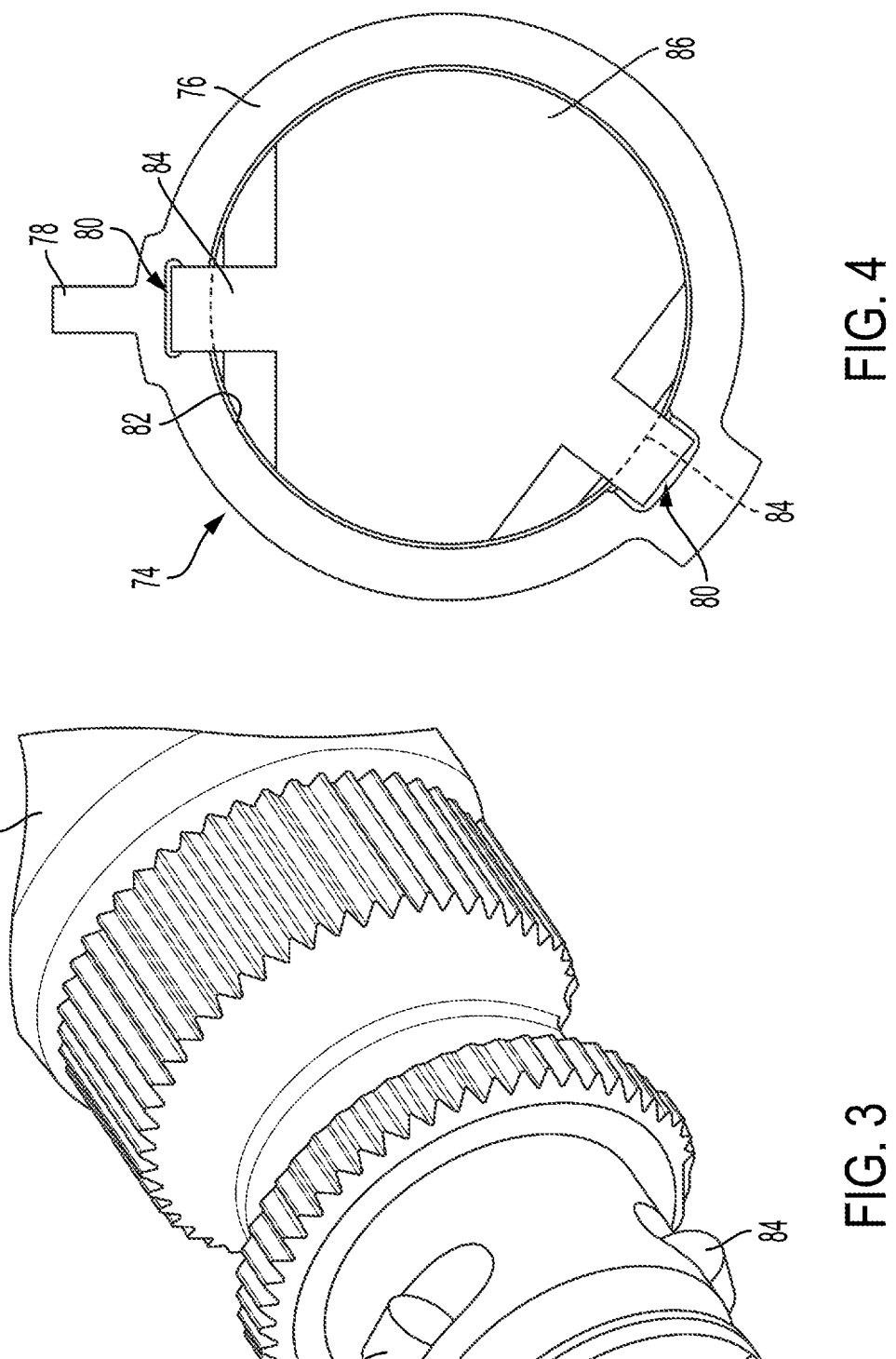
FIG. 3 is a perspective view of a shaft of the steering shaft assembly.
FIG. 4 is a cross-sectional view of the joint region.

Referring now to FIGS. 3 and 4, the ring flag 74 includes one or more female geometrical features 80 defined by an inner wall 82 of the ring portion 76 and one or more male geometrical features 84 protruding from the outer diameter 86 of a portion of the intermediate shaft 70. The male geometrical feature(s) 84 on the intermediate shaft 70 are pinch tabs in the illustrated embodiment, but alternative protruding features are contemplated. The female geometrical feature(s) 80 defined by the ring flag 74 are receiving notches in the illustrated embodiment, but alternative geometries are contemplated. Regardless of the specific geometry and dimensions of the female and male geometrical features 80, 84, alignment geometry features may be formed instead of machined on the intermediate shaft 70, thereby reducing cost.

The geometric features 80, 82 allow assembly of ring flag alignment geometric features 80 to engage the features 82 of the intermediate shaft 70 before a press process is required to overcome a lead-in taper 88 of the end portion of the intermediate shaft 70, thereby eliminating need for a special assembly tool to orient the ring flag 74 properly with the intermediate shaft 70. In other words, the ring flag 74 is rotationally positioned in a desired alignment relative to the intermediate shaft 70 prior to the press process for final axial installation (see assembly stages in FIGS. 5-7).

Figure 9:
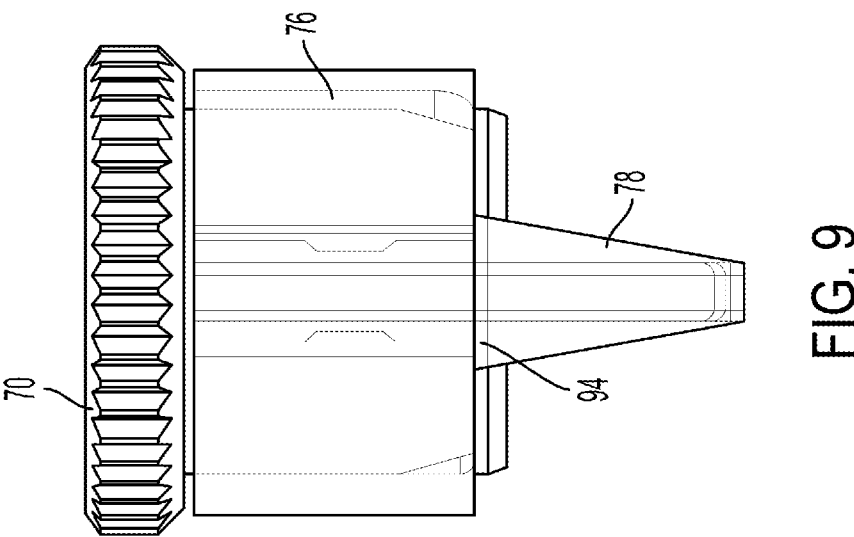
FIG. 9 is a top plan view of the joint region.

The lead-in diameter of the intermediate shaft 70 is substantially equal to the inner diameter of the ring portion 76 of the ring flag 74 to ensure proper orientation of the male features 82 of the intermediate shaft 70 within the female features 80 of the ring flag 74. A retention shoulder 90 (FIGS. 5-7) on the intermediate shaft 70 is submerged below the ring flag installation area diameter and a retention lip 92 is present on the inner diameter of the ring portion 76 of the ring flag 74, which snaps into the groove. The cross-section of ring flag 74 extension that protrudes off the end of the intermediate shaft 70 is reduced by moving the alignment geometry features 80, 82, so gussets 94 along the ring diameter are present for strength, as shown in FIGS. 8 and 9.

Figure 5:
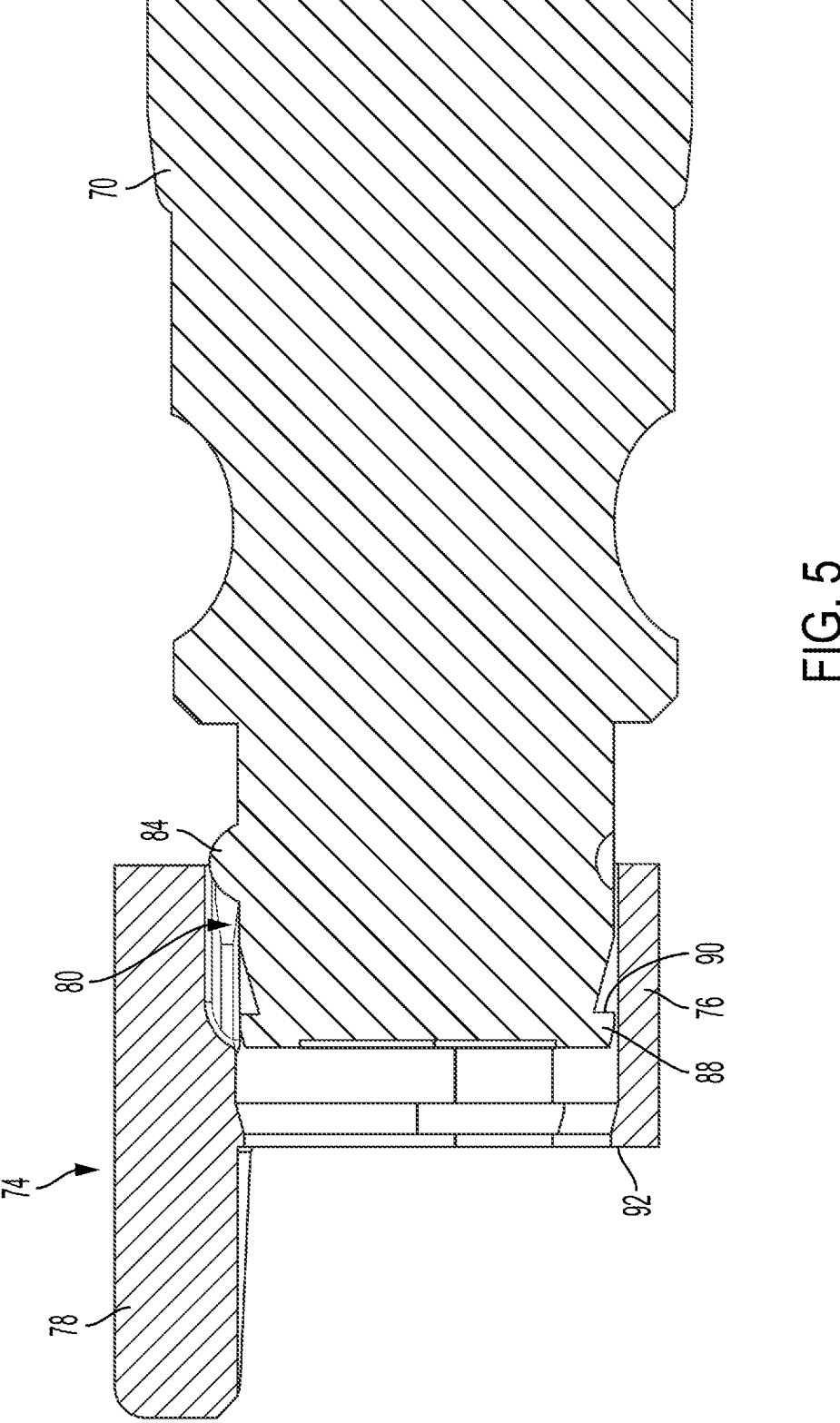
FIG. 5 is a cross-sectional view of a ring flag and the shaft in a first assembly position.
Figure 6:
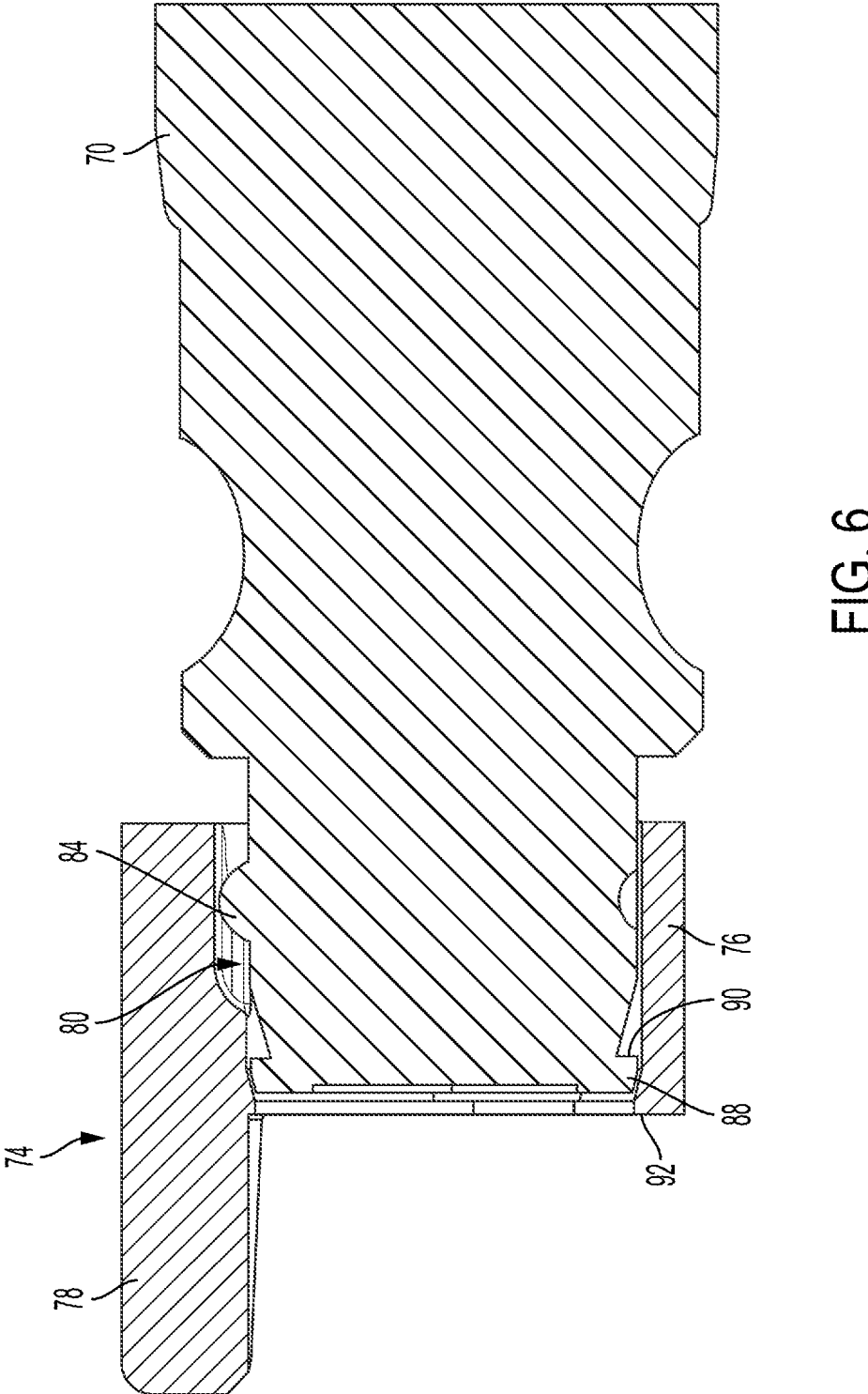
FIG. 6 is a cross-sectional view of the ring flag and the shaft in a second assembly position.
Figure 7:
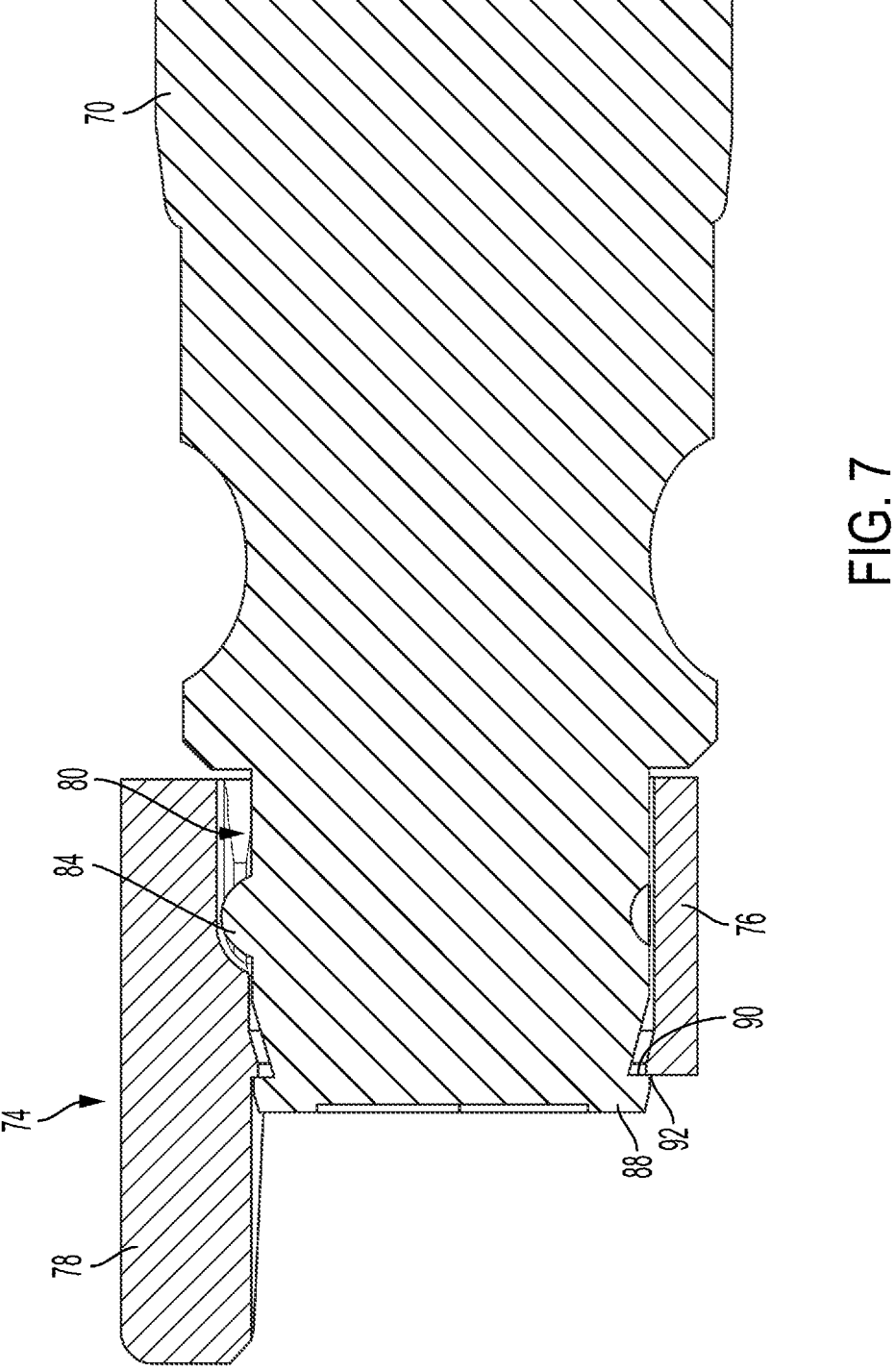
FIG. 7 is a cross-sectional view of the ring flag and the shaft in a third assembly position.
Figure 8:
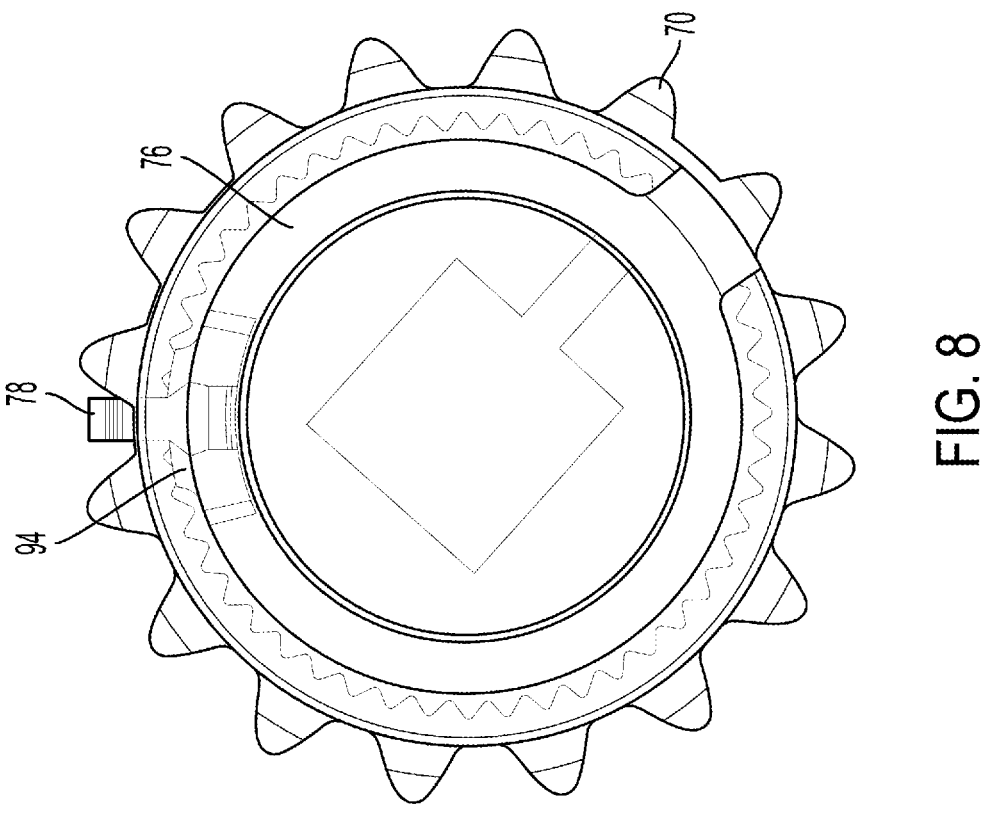
FIG. 8 is an end view of the joint region.

FIGS. 5-7 illustrate an axial progression of coupling of the intermediate shaft 70 and the ring flag 74 to a desired relative axial position. In particular, as the ring flag 74 advances axially, relative to the intermediate shaft 70, the ring flag 74 is displaced to position an access path (e.g., hole) where a bolt is to be passed through for coupling of the intermediate shaft 70 to the other structural member.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:
1. A steering shaft assembly comprising:
   a yoke;

US 12,698,806 B2

5 a shaft having an end region to be coupled to the yoke with a mechanical fastener, the shaft comprising a protrusion extending radially outwardly from the shaft within the end region of the shaft, and including a lead-in taper positioned at the end region, a retention shoulder, and a groove; and a ring flag coupleable to the end region of the shaft, the ring flag comprising a ring portion defining an aperture to receive the shaft, the ring portion having an inner wall that defines a recess positioned to receive the protrusion of the shaft at a desired relative axial position of the ring flag and the shaft to rotationally align the ring flag and the shaft at a desired rotational position, and a retention lip positioned on the inner wall of the ring portion, wherein the retention lip is snap-fit over the lead-in taper and snaps into the groove to define the desired relative axial position.

2. The steering shaft assembly of claim 1, wherein the protrusion is one of a plurality of protrusions axially aligned with each other and circumferentially spaced from each other.

3. The steering shaft assembly of claim 2, wherein the recess of the ring flag is one of a plurality of recesses axially aligned with each other and circumferentially spaced from each other.

4. The steering shaft assembly of claim 1, wherein the protrusion is a pinch tab.

5. The steering shaft assembly of claim 1, wherein the recess of the ring flag is defined within an inner wall of the ring flag.

6. The steering shaft assembly of claim 1, wherein the ring flag further comprising:

a flag portion extending from the ring portion.

7. The steering shaft assembly of claim 6, wherein the flag portion is longer axially relative to the ring portion.

8. The steering shaft assembly of claim 1, wherein the ring flag comprises at least one gusset.

9. The steering shaft assembly of claim 1, wherein the shaft is an intermediate shaft and the component the intermediate shaft is to be coupled to is a yoke.

10. A method of assembling a steering shaft assembly comprising:

aligning a protrusion extending radially outward from an end portion of a shaft with a recess defined by an inner wall of a ring portion of a ring flag, the shaft including a lead-in taper and a groove;

inserting a shaft through an aperture defined by a ring flag with the protrusion disposed within the recess to provide a desired rotational position of the ring flag relative to the shaft;

axially moving the shaft to a desired axial position relative to the ring flag; and snap-fitting a retention lip positioned on the inner wall of the ring portion over the lead-in taper and into the groove to define the desired axial position; and coupling the shaft to a yoke.

11. The method of claim 10, further comprising aligning a plurality of protrusions of the shaft with a plurality of recesses defined by the ring flag to align the shaft relative to the ring flag.

12. The method of claim 10, wherein the protrusion is inserted within the recess prior to snap-fitting the retention lip over the lead-in taper.

*    *    *    *    *